Dec. 20, 1932.                P. VIRY                1,891,699
                AUTOMATIC MACHINE HEATING BY INDUCTION
                        Filed Dec. 4, 1928
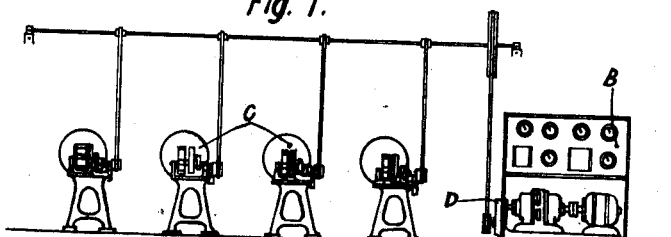
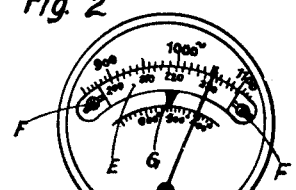
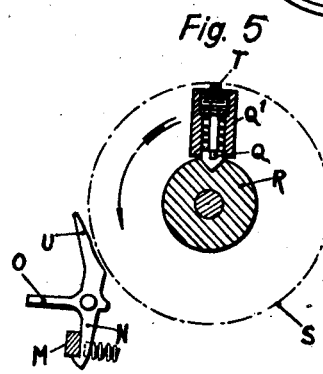
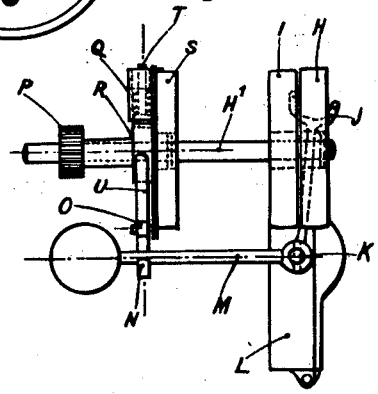
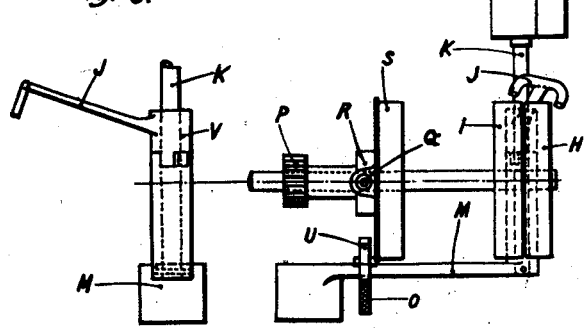
P. Viry INVENTOR
By: Marks & Clerk
ATTYS.

Patented Dec. 20, 1932

1,891,699

UNITED STATES PATENT OFFICE

PIERRE VIRY, OF CHATELLERAULT, FRANCE

AUTOMATIC MACHINE HEATING BY INDUCTION

Application filed December 4, 1928, Serial No. 323,711, and in France December 12, 1927.

This invention relates to improvements in automatic machines heating by induction, and relates more particularly to installations based on the principle in which the local heating of tubular parts is effected by combining the transformer furnaces with automatic machines intended for feeding them.

The present invention relates to improvements in these installations as well as in those in which the feeding machines have a rotary movement, these improvements being intended to ensure regularity of heating.

The intensity of heating varies, on the one hand, with the voltage of the heating current and with its frequency, that is to say with the speed of rotation of the converter group generating the heating current, and on the other hand, with the speed of rotation of the automatic machines.

By taking the movement of the machines from the converter group itself, it is possible to eliminate variations of heating due to the variations of the mechanical drive of the automatic machines when the said drive is an independent one, so that there is left only one cause of variations, the speed of the converter group. Moreover, it is possible to obtain in that way a certain self-regularization of the heating. If in fact the speed of the converter group increases, the voltage of the high frequency alternator increases, and consequently the heating tends also to rise, but the movement of the machines being derived from the group itself, the increase of speed of the machines will produce a reduction of the heating, which could compensate the increase due to the increase of voltage.

In the event of the motor of the converter group being such that the speed cannot be regulated (for instance an asynchronous motor), this arrangement could be completed by securing to the frequency meter of the heating current or to the speed indicator, a movable scale with a graduation in volts, which will give, opposite each value of frequency, the voltage to be used for a given intensity of heating. For the purpose of maintaining the heating constant, it will be sufficient to regulate the voltage to the value indicated by the frequency meter.

On the other hand, the solidarity of movement of the group and of the machines, ensures in the event of the stoppage of the group and consequently of the failure of heating current, the stoppage of the machines. The machines are not liable therefore to deliver non-heated products.

In order to be efficacious, this arrangement must be completed by making interdependent the throwing out of gear of each automatic machine dependent and the opening of its current switch, so as to obtain simultaneously the stoppage of the machine and the cutting off of the current or conversely.

The construction according to the invention will be more clearly understood with reference to the accompanying drawing in which:

Fig. 1 is a front view of the converter group and automatic means.

Fig. 2 is a front view of the frequency meter.

Fig. 3 is a top plan view of the device for throwing out of gear the automatic means.

Fig. 4 is a side elevation of Fig. 3.

Fig. 5 is a vertical sectional view through the sleeve and pin housing.

Fig. 6 is an end view of part of Fig. 3.

Figure 1 shows a heating installation according to the invention, comprising a converter group A with its switchboard B, and automatic machines C, for instance to the number of four, to which current is supplied and which are driven by the group A, a speed reducing gear D provided on the group, enabling the line shaft to be driven direct. The switchboard B comprises more particularly a voltmeter and a frequency meter, for indicating the voltage and the frequency of the heating current.

Figure 2 shows the arrangement of the graduation or scale of the frequency meter or of the speed indicator, for the case in which the speed of the group cannot be regulated. The scale E graduated in volts is movable relatively to the scale graduated in frequencies, and can be fixed by means of screws F at the desired point for a given intensity of heating. An index or hand G secured to the movable scale, can move in front of a scale indicating the intensity of heating, either in conventional figures or in degrees.

Figures 3, 4, 5 show respectively in plan, in elevation and in cross-section, a system of throwing out of gear for automatic machines for reheating, in which the machine is thrown out of gear and the heating current is cut off simultaneously, and conversely. They show also a strain limiting device which automatically throws the machines out of gear and cuts off the current when an abnormal strain is produced during the working of the machine.

H is the driving pulley of the machine, driving the shaft H', and l the loose pulley. The disengaging or striking fork J which enables the driving belt to be moved from one pulley to the other, is controlled by a spindle K which operates also the quick-break switch L. The spindle K is secured to a balance-weight lever M which can be held in the engaging position by the pawl N. In these conditions by pressing on the trigger O, the lever M is released, and under the action of its balance weight, turns the spindle K which moves the striking fork and operates the switch, thereby producing simultaneously the throwing out of gear and the operation of the switch, thus simultaneously stopping the machine and cutting off the current. Conversely, by raising the lever M and hooking it again to the pawl N, the machine will be started and heating current sent to the furnaces.

To ensure an automatic throwing out of gear in the case of an abnormal strain, there is provided a strain limiting device which operates the said throwing out of gear in the following manner: The driving pinion P of the machine is not keyed to the shaft of the driving pulley H, but the connection between the said pinion and the shaft is effected by means of a pin Q pressed by an adjustable spring Q' into a notch provided in a sleeve R forming an extension of the pinion. This pin Q is mounted on a disc S keyed to the shaft of the pulley H. In the event of an abnormal strain being produced, the pin will slide in its notch, and will no longer drive the pinion. Moreover, the end T of the pin will come out, and in its movement of rotation will meet the branch U of the pawl N thus throwing the machine out of gear and cutting off the current. The disengaging fork J instead of being keyed to the spindle K, could have a certain independence, so as to take into account different amplitudes required in the movement of the switch and that of the disengaging fork. To that end, it could be keyed, as shown in Figure 6, to a sleeve V surrounding the spindle K, the driving of which is produced by means of two teeth with the desired clearance.

I claim:

1. An improvement for regulating the heating by induction in automatic machines which comprises an electrical converter for generating electrical heating current, the heating current being regulated by the varying speeds of the converter group and machines, mechanical means for driving said automatic machines from said group and indicating means for said generating group according to which the voltage for said automatic machine heating units may be regulated.

2. An improvement for regulating the heating by induction in automatic machines which comprises an electrical converter group for generating electrical heating current, the heating current being regulated by the varying speeds of the converter group and machines, mechanical means for driving said machines from the group, strain limiting devices associated with the shafts of the machines adapted to throw the machines out of gear to cut off the current when abnormal strain is applied to the shafts.

3. An improvement for regulating the heating by induction in automatic machines which comprises an electrical converter group for generating electrical heating current, the heating current being regulated by the varying speeds of the converter group and machines, mechanical means driving said machines from said group, the driving shafts of the machines having spring restrained interlocking devices associated therewith operable to release the shafts to cut off the current when abnormal strain is imparted to the shafts.

In testimony whereof he has signed this specification.

PIERRE VIRY.